May 19, 1936.  G. SUNDBACK  2,041,156
METHOD OF MAKING SEPARABLE FASTENER SLIDERS
Filed Jan. 16, 1923
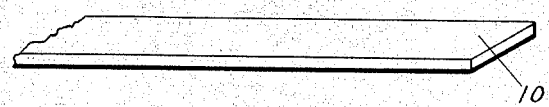
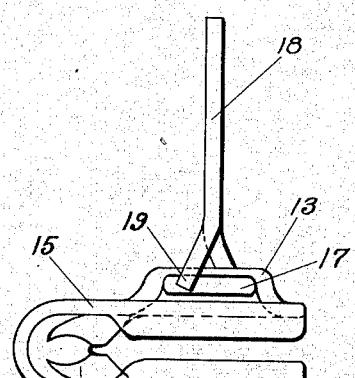
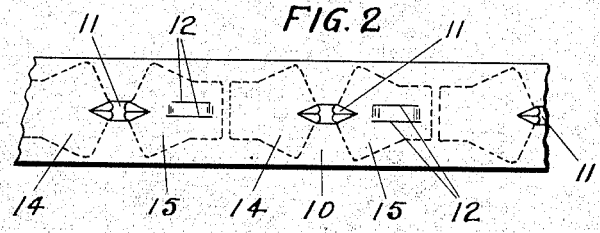
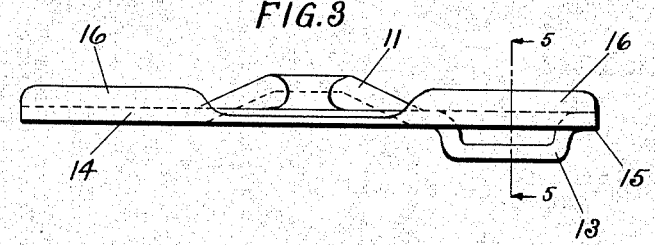
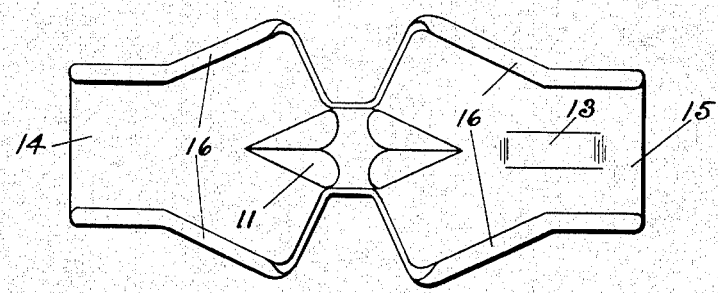
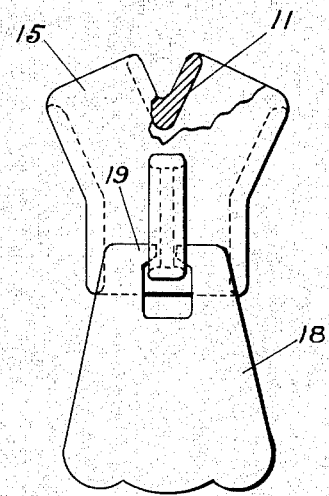
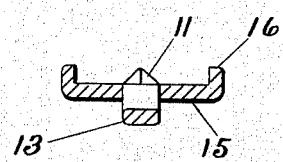
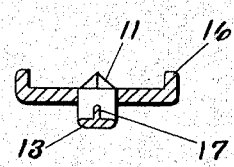
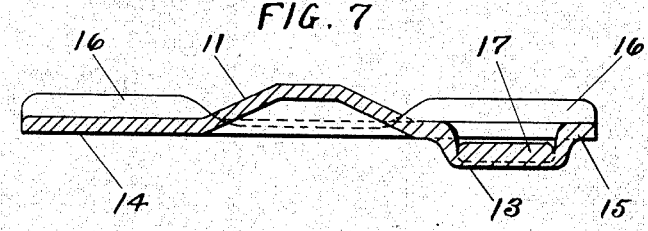
INVENTOR.
Gideon Sundback
BY
J. S. Wooster
ATTORNEY.

Patented May 19, 1936

2,041,156

UNITED STATES PATENT OFFICE 2,041,156

METHOD OF MAKING SEPARABLE FASTENER SLIDERS

Gideon Sundback, Meadville, Pa., assignor to Hookless Fastener Company, Meadville, Pa., a corporation of Pennsylvania Application January 16, 1928, Serial No. 247,043

2 Claims. (Cl. 29—148)

This invention relates to separable fastener sliders and has for its object to provide a slider which is simple in construction, short and compact, yet rigid enough to withstand severe operating strains, and in which the cost of manufacture is reduced to a minimum.

A separable fastener slider is subjected to severe operating strains which tend to spread it, as when the fastener is closed under strain, and also often tending to contract it, as in a wringer when used on washable goods, or accidently in other ways, so that if a separable fastener is to be serviceable, the slider must be rigid. For economic reasons the slider should require little material, and should be simple to construct and complete.

This invention provides a compact, one-piece sheet metal slider which fulfills these requirements. The slider consists of a pair of overlying wings connected by a bent portion which is embossed to form an integral projection lying directly between the wings. The embossed projection maintains the wings in fixed spaced relation, opposing both expansion and contraction. A portion of one wing is also embossed to provide a projection for attaching a pull device. Among the advantages of this slider are its overall compactness, resistance to crushing and spreading, durability, and substantial reduction in cost of manufacture.

The invention is a modification of that disclosed and claimed in my Patent #1,661,144, issued February 28, 1928, in which the slider wings are inwardly connected by an integrally thickened reinforce, and in which one wing is provided with an integrally thickened pull attaching lug. Such sliders are usually blanked out of a thick strip of metal by means of dies, similar to those employed in coining processes, which reduce the strip to the desired wing thickness while forming the thickened reinforce and pull attaching lug in the desired positions. Those sliders have at all times been successful in operation.

An important advantage of the present invention is that the sliders can be blanked out of strip metal of the same thickness as the finished slider wings, and the metal simply stretched in the proper places by means of light embossing dies to form the reinforcing projection and pull attaching lug. This method not only effects a saving in material, but also eliminates the use of heavy coining presses heretofore employed to reduce the strip metal to the desired wing thickness while forming the thickened reinforce and pull attaching lug.

The invention will be described in connection with the accompanying drawing, in which:

Fig. 1 shows a strip of metal from which the slider is formed;

Fig. 2 illustrates the forming of the slider blanks;

Fig. 3 is a side view of the formed slider blank;

Fig. 4 is a plan view of the slider blank shown in Fig. 3;

Fig. 5 is a section taken on the line 5—5 of Fig. 3;

Fig. 6 is a view similar to Fig. 5 after the pull attaching lug has been formed;

Fig. 7 is a longitudinal section through the slider blank of Fig. 4 after the pull attaching lug has been formed;

Fig. 8 is a side view of the slider bent to final form, showing the method of attaching the pull device; and Fig. 9 is a broken plan view of the completed slider, showing the pull device attached.

The slider may be formed from an elongated strip of metal 10 of the same thickness as it is desired to give the wings of the finished slider. The diamond-shaped projections 11 are formed in the strip 10 by means of embossing dies which emboss and stretch the metal at the desired intervals along the strip, as shown in Fig. 2. Parallel slits 12 are cut in the strip 10 in about the location and of the shape illustrated in Fig. 2, after which the metal between the slits is stretched by means of a punch to form lugs 13 of the shape shown in Fig. 3. If each wing of the slider is to have a separate pull device, two lugs 13 are formed on the same side of the strip 10 for each slider blank, one at the right and the other at the left of each embossed projection 11. The wings 14 and 15 are next blanked out of the strip 10, as shown in dotted lines in Fig. 2, so as to have each pair of wings connected by an embossed projection 11.

The lateral edges of one or both of the wings 14 and 15 are next formed to provide guiding means, as by being bent up to provide flanges 16, as illustrated in Figs. 3, 4 and 5, which serve to guide the slider along the interlocking members of a separable fastener and also stiffen the wings longitudinally. The lug 13 is then stiffened by means of dies to provide a tongue 17, as shown in Figs. 6 and 7. The tongue 17 strengthens and supports the lug 13 and prevents it from becoming bent and deformed when under strain. Other ways of stiffening the struck up lug can be used, as by doubling it into a curved or V-shaped cross section.

The wings 14 and 15 are next bent to parallelism, as shown in Figs. 8 and 9, so that the embossed projection 11 lies inside the bend and directly between the wings. The embossed projection 11 preferably extends longitudinally inside the wings from the bend down to at least a transverse line joining the outer wing corners, as shown in Fig. 9. The wings may be bent together over dies or forming tools which compress and compact the embossed projection 11 and give it the desired smooth diverging surfaces for guiding the interlocking members of a separable fastener. The slider blanks may be annealed or heat treated between operations, if desired, but preferably not after the final bending and forming, so that the set which the metal is given in bending is utilized to give the slider strength, stiffness and hardness to resist the abrasion of the interlocking members in use.

A pull device 18 is blanked out of sheet metal and the attaching projections 19 spread apart, as illustrated in Fig. 8, in order to permit the pull device to be secured to the lug 13 by contracting the projections 19 back into the plane of the pull device, as shown in Fig. 9. The completed slider is ready for affixing to a fastener after tumbling or other finishing operations.

The slider of this invention is simple in construction, short and compact and therefore economical of material, and yet is extremely durable and rigid enough to withstand severe operating strains. The slider is materially shortened by locating the reinforcing projection directly between the wings, thereby eliminating the neck portion and external stiffening means which have been commonly employed in the past. The slider, being short and compact, resists both expansion and contraction because the distorting moments are brought close to the center of the slider. Since the inturned edge flanges of the wings stiffen them, it will be seen that substantially the entire length of the slider is stiffened either by the wing flanges or by the embossed reinforcing projection between the wings which extends down to about the place where the flanges begin. The slider is thus symmetrically reinforced and both wings equally stiffened.

The term "embossing" is used herein and in the appended claims to define that process of striking up a projection on a sheet metal piece which comprises a combination bending and drawing operation formed by a die cavity shaped the same as the desired shape of the projection, and by a punch having a corresponding shape operating on opposite sides of the flat metal.

The invention is not limited to the particular details or method of construction herein shown and described, but includes various modifications within the scope of the appended claims.

The invention claimed is:

1. The method of making separable fastener sliders which comprises embossing a diamond-shaped projection in a piece of sheet metal, cutting out from said piece of sheet metal a blank comprising flat slider wings joined end to end by the relatively narrow embossed projection, said projection extending into the body portion of said wings from said relatively narrow portion, forming flanges on the sides of said wings, and bending said wings into parallelism with said projection on the inner side of the bend and said flanges projecting toward each other to form a slider with a Y-shaped channel.

2. The method defined in claim 1 wherein a pull attaching loop is formed in one of said wings by cutting and striking up material from the flat metal of the wing before the bending operation on said slider blank.

GIDEON SUNDBACK.